Nov. 8, 1932.　　　　E. E. ZECH　　　　1,887,368
PROCESS FOR MOLDING ASPHALTIC COMPOSITIONS AND MOLD THEREFOR
Filed Aug. 27, 1931　　2 Sheets-Sheet 1
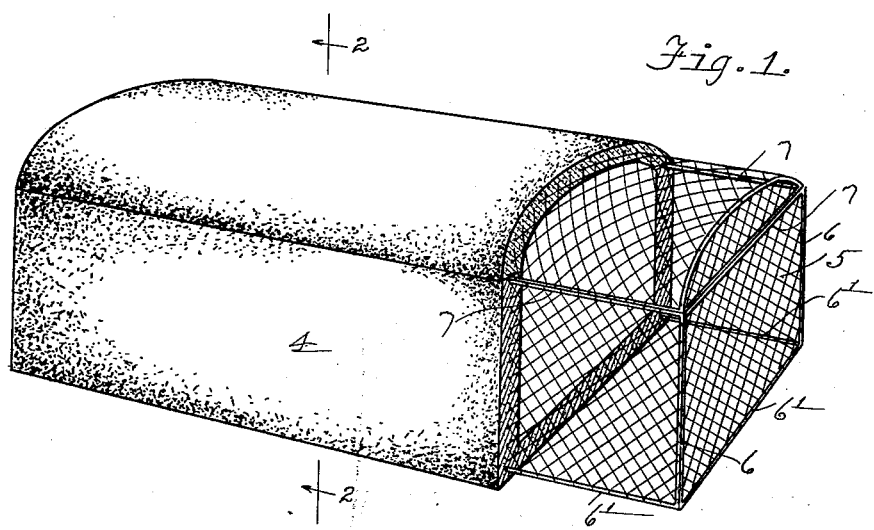
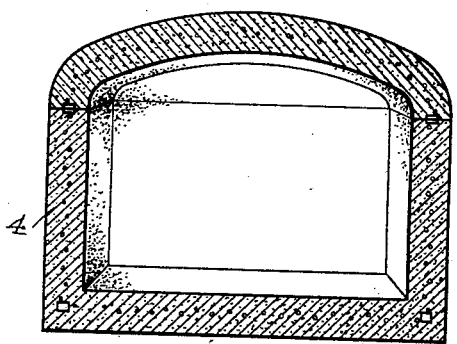
Inventor
Edward E. Zech
By Rice and Rice
Attorneys
Witness:
Geo. L. Chafas Nov. 8, 1932.   E. E. ZECH   1,887,368
PROCESS FOR MOLDING ASPHALTIC COMPOSITIONS AND MOLD THEREFOR
Filed Aug. 27, 1931    2 Sheets-Sheet 2
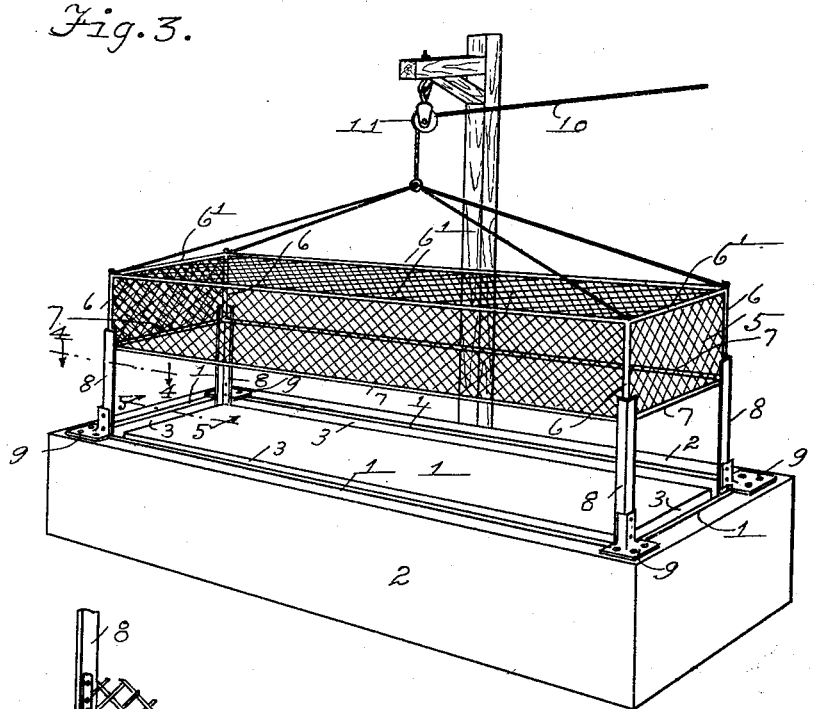
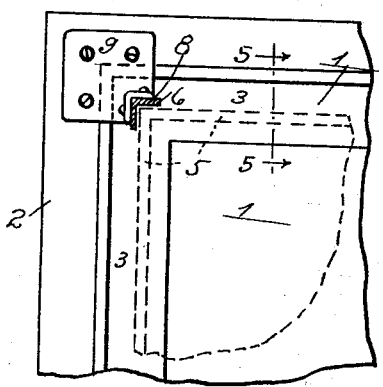
Inventor
Edward E. Zech
By Rice and Rice
Attorneys Patented Nov. 8, 1932

1,887,368

UNITED STATES PATENT OFFICE

EDWARD E. ZECH, OF GRAND RAPIDS, MICHIGAN, ASSIGNOR OF ONE-FOURTH TO ORLO W. JUDKINS, ONE-FOURTH TO BERT JOHNSON, AND ONE-FOURTH TO GEORGE LANG-LANDS, ALL OF GRAND RAPIDS, MICHIGAN

PROCESS FOR MOLDING ASPHALTIC COMPOSITIONS AND MOLD THEREFOR

Application filed August 27, 1931. Serial No. 559,699.

The present invention relates to articles made of asphalt, processes for making the same, and means for carrying out said processes; and its object is, generally, to provide improved asphaltic compositions, improved processes for making articles therefrom, and improved means for carrying out such processes.

The substance commonly called asphalt (including asphaltic compositions or compositions of matter in which such asphalt is the body or principal ingredient), if melted and poured into molds of rigid material, adheres thereto so that the molded article can not be readily withdrawn therefrom or without deforming or injuring the article.

The principal object of this invention therefore is to provide an improved process for molding such asphalt or asphaltic compositions whereby these difficulties are avoided, further objects being to provide such improved compositions which may be readily thus molded into tough and stable articles of desired shape and form, and improved molds for molding the same; and further, to provide strengthening or reinforcing elements molded into the articles, and means for inserting such elements into the molds without injuring the same.

In the accompanying drawings:

Figure 1 is a view in perspective of a molded body—a burial vault—made of an asphaltic composition, partially broken away to show the reinforcing element embedded therein;

Figure 2 is a transverse sectional view thereof taken on line 2—2 of Figure 1;

Figure 3 is a view in perspective of a mold for making said body and of means for guidedly inserting said element into the mold;

Figure 4 is a horizontal sectional view of corner portions thereof taken on line 4—4 of Figures 3 and 5; and Figure 5 is a vertical sectional view of the same taken on line 5—5 of Figures 3 and 4.

In carrying out my process I provide a mold composed of molding sand (or equivalent material), indicated at 1 in Figures 3, 4 and 5 of these drawings, contained in a box or flask 2. This mold and the formation of the sand thereof by a suitable pattern are the same as in molds for metal. I prepare an asphaltic composition, melt and pour the same into the recesses 3 in the sand formed by the pattern. When cool, the molded body or article—in the illustrated example, the main part 4 of the burial vault illustrated in Figures 1 and 2—is readily removed from the mold. It is immaterial that particles of sand may cling to the molded article for the same may be readily removed therefrom. It will be seen that bodies or articles having projections and recesses in their surfaces, or articles of artistic form having bas relief or intaglio surfaces may be molded in such a mold and withdrawn therefrom without injury.

I have found that a composition including some, or all, of the following ingredients in the following proportions is a desirable, and in my view a preferable, asphaltic composition for molding by my process and in such a mold, viz.:

| | Per cent |
|---|---|
| Mexican oil asphalt | 60 |
| Gilsonite asphalt | 10 |
| Strengthening fibres, as asbestos | 10 |
| Hardwood particles or sawdust | 5 |
| Wood ashes | 5 |
| Amorphous lime | 5 |
| Rosin | 3 |
| Chloride of lime | 2 |

The meltable ingredients are melted and they and the other ingredients are thoroughly mixed together and the mass is then poured into the mold and left to cool and harden therein.

This composition forms a body or article that is stable, tough and sufficiently rigid and is waterproof as is required for burial vaults and the like. In order to add to the strength of the article or body, I embody therein in the molding thereof a suitable strengthening element or "reinforcement". A preferable form of such reinforcement is the wire mesh structure 5 shown in the drawings having angle-iron corner members 6, 6¹ and edge members 7. In order to insert this reinforcing or strengthening element into the recesses 3 of the mold formed by the pattern, without contacting the sand at the sides of said recesses and thus injuring or breaking down the sand formation, I provide the mold with guide members 8 mounted at 9 in connection with the flask of the mold, at the mouth thereof, and extending parallelly with the sides of said recesses. In the form illustrated, these guide members are of angle-iron and the corner members 6 slide guidedly in the guide members into the mold. The reinforcing element may be suspended and slowly lowered by the cord 10 extending over a pulley 11.

I claim:

1. The process for making a body composed of asphalt which includes forming a mold of sand, melting the asphalt, and pouring the same into the mold.

2. The process for making a body composed of reinforced asphalt, which includes forming a mold, inserting a reinforcing element thereinto, melting the asphalt, and pouring the same into the mold around the reinforcing element.

3. The process for making a body composed of reinforced asphalt which includes forming a mold of sand, inserting a reinforcing element thereinto spaced from the sand, melting the asphalt, and pouring the same into the mold around the reinforcing element.

4. A mold for bodies having a reinforcing element, comprising a flask containing sand disposed in mold form by a pattern, and guide members mounted in connection with the flask for guiding the reinforcing element into the mold spacedly from the sand thereof.

In testimony whereof I have hereunto set my hand at Grand Rapids, Michigan, this 24th day of August, 1931.

EDWARD E. ZECH.